Figure 1:
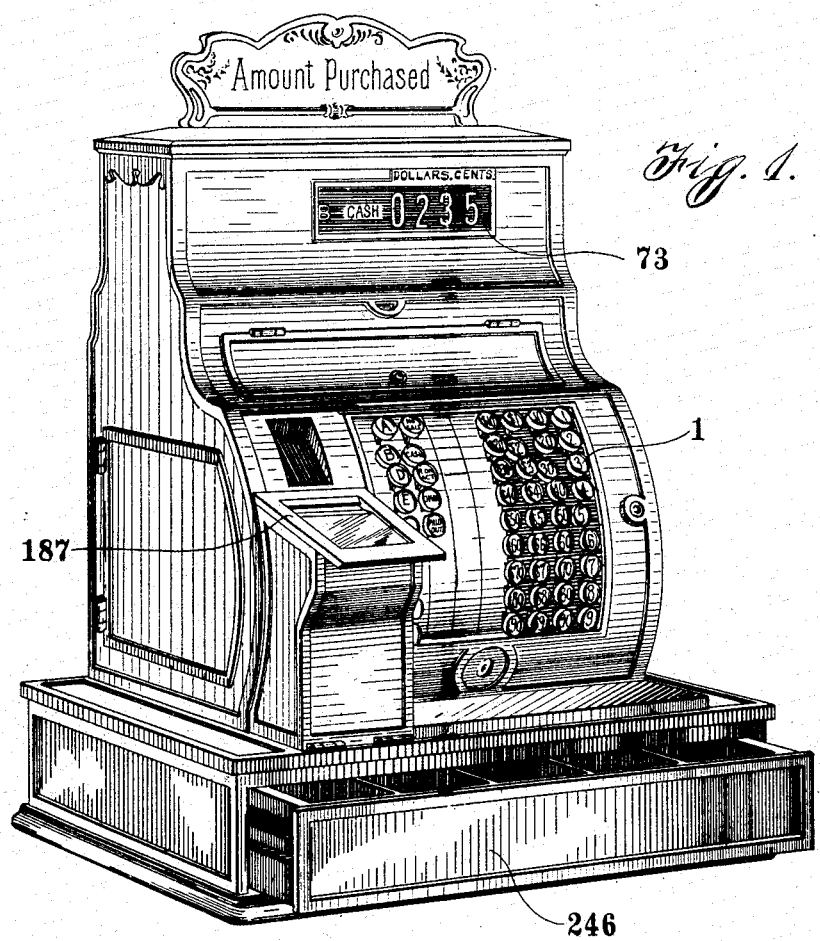

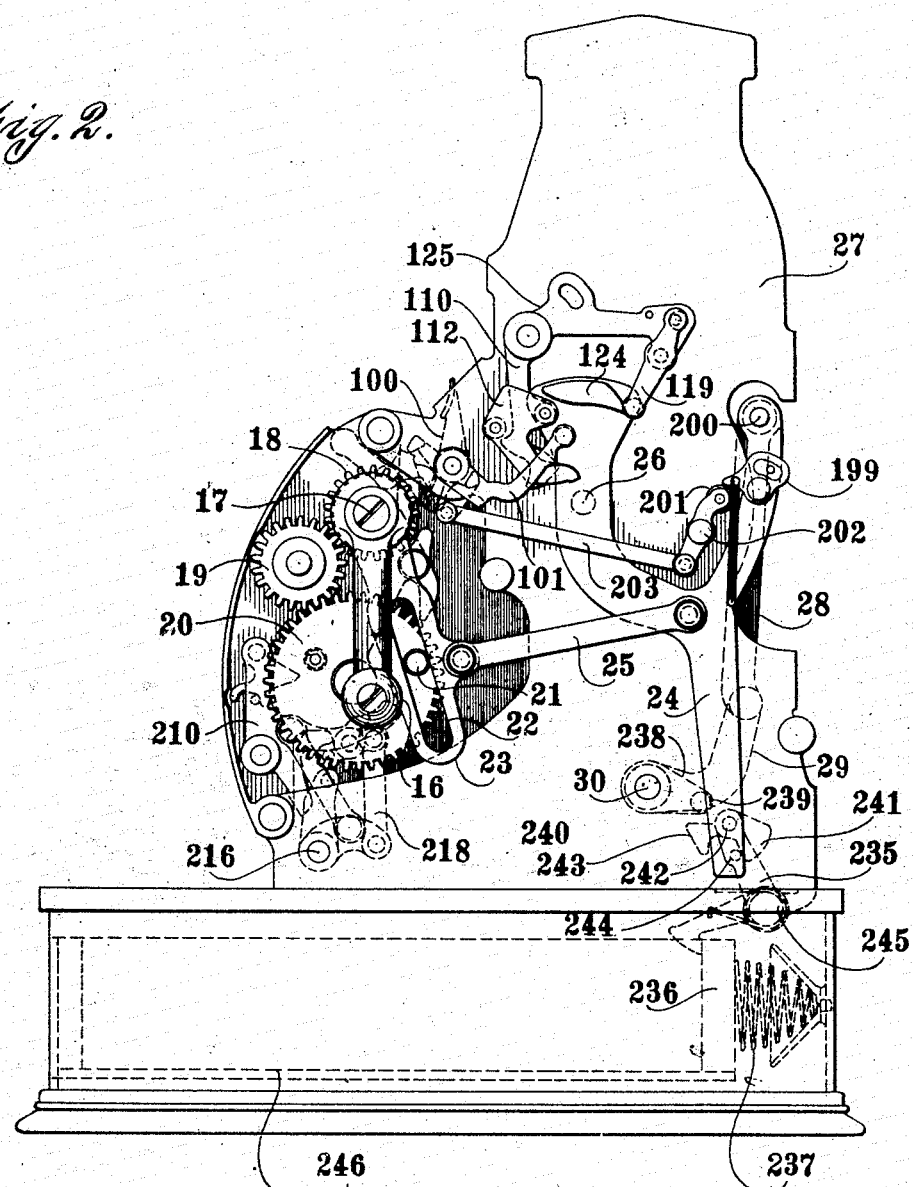

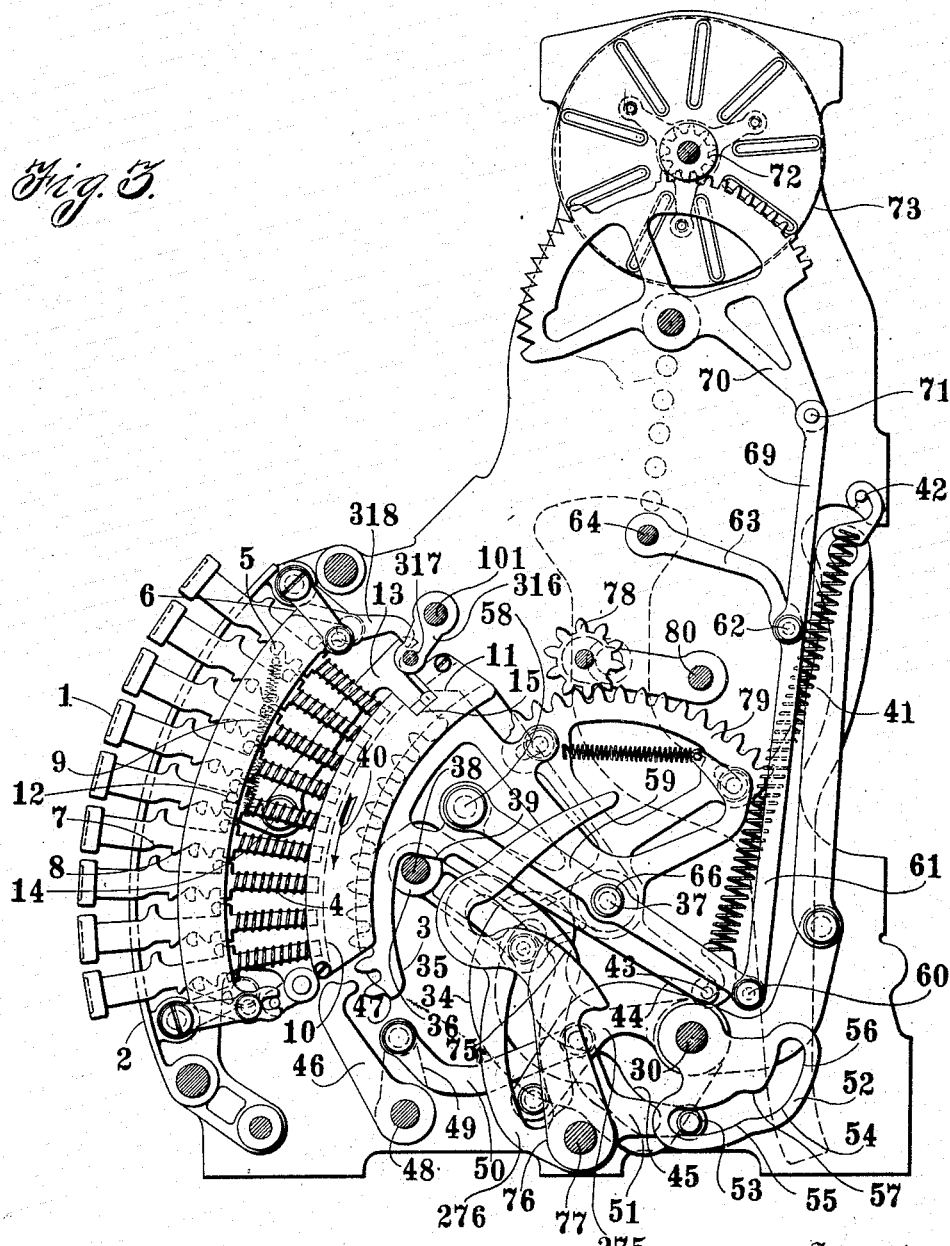

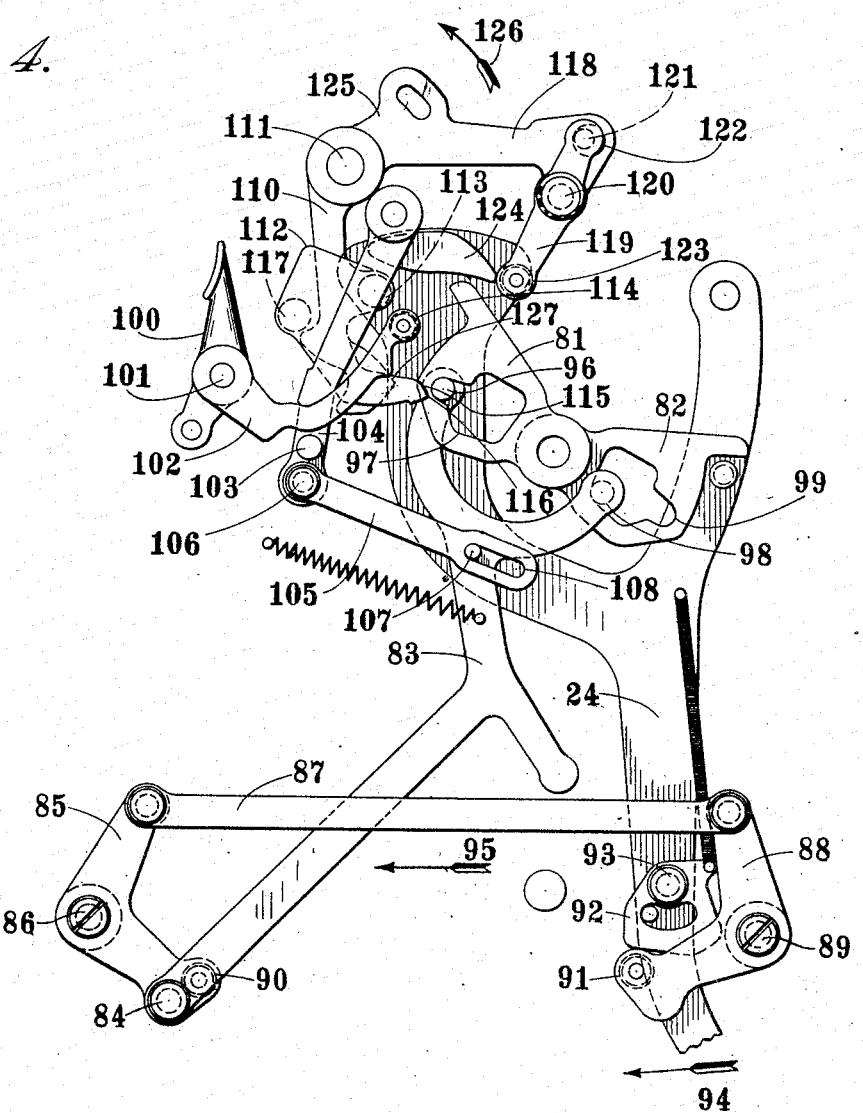

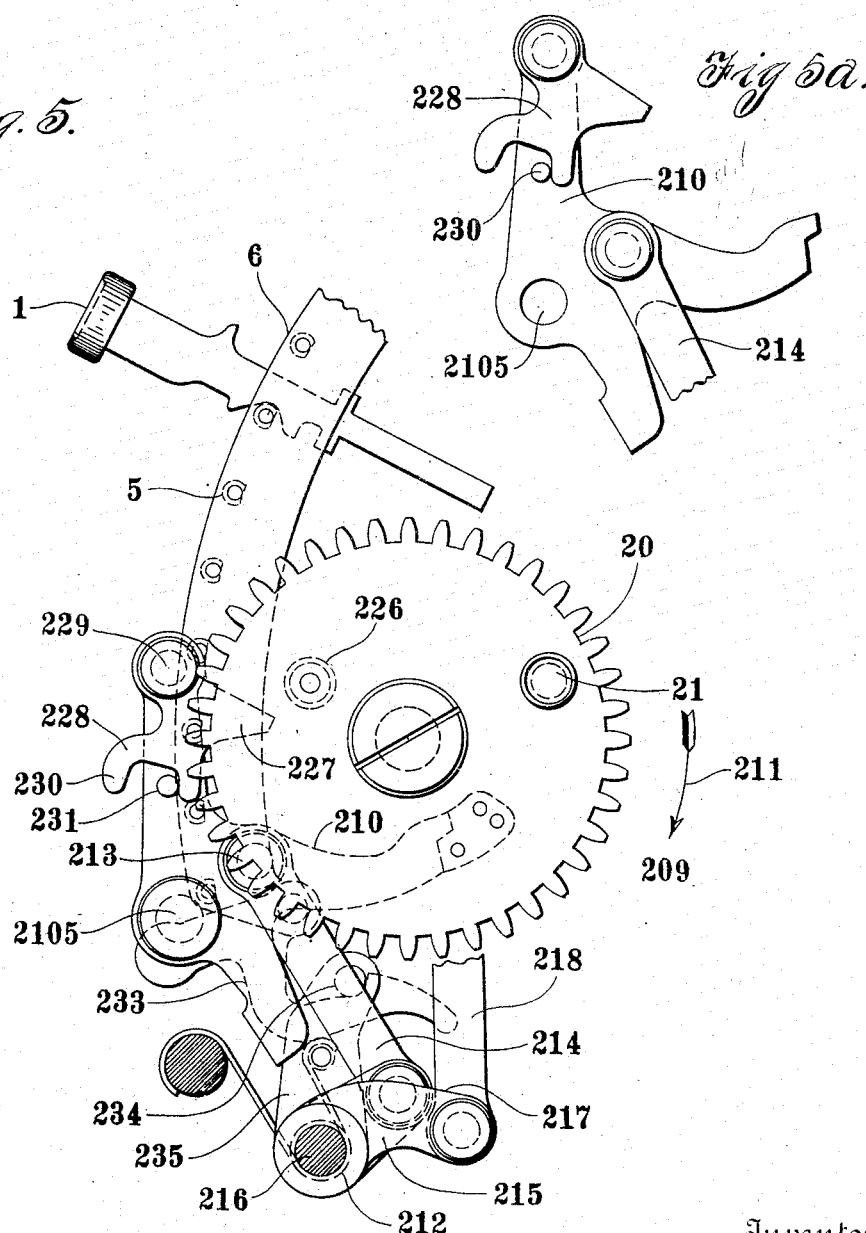

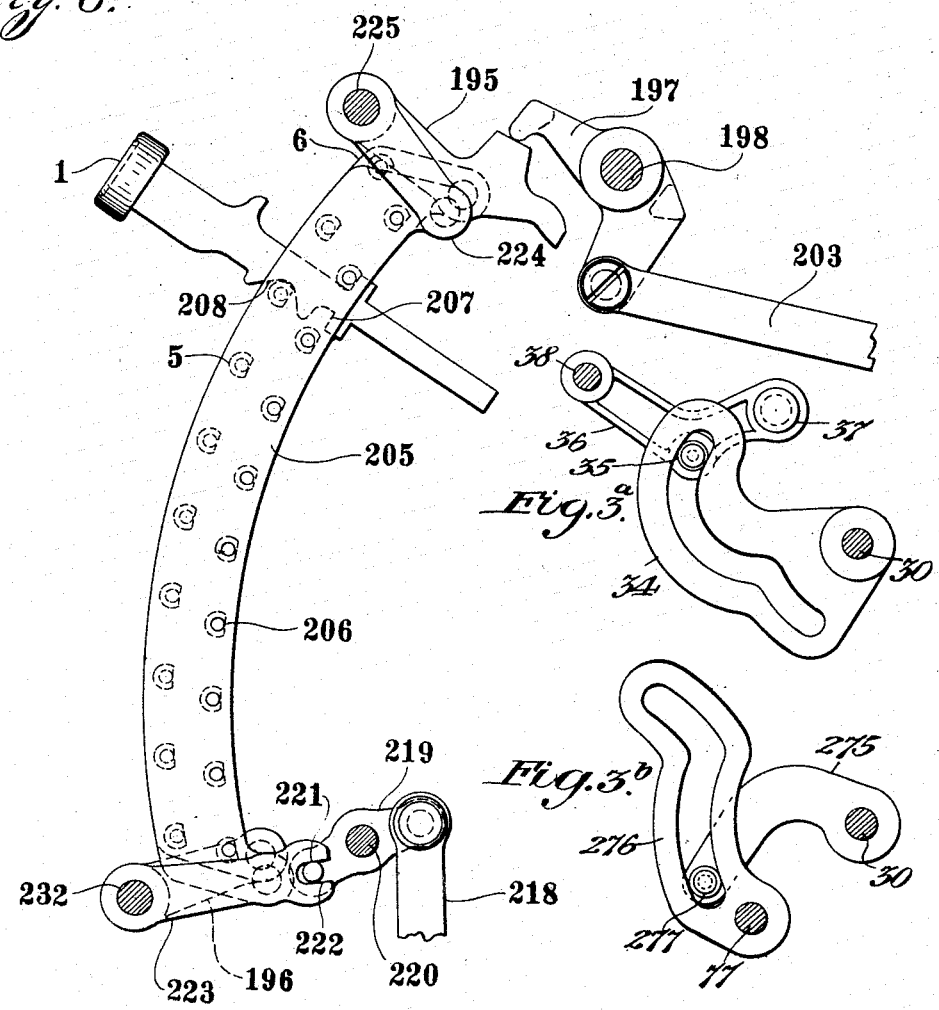

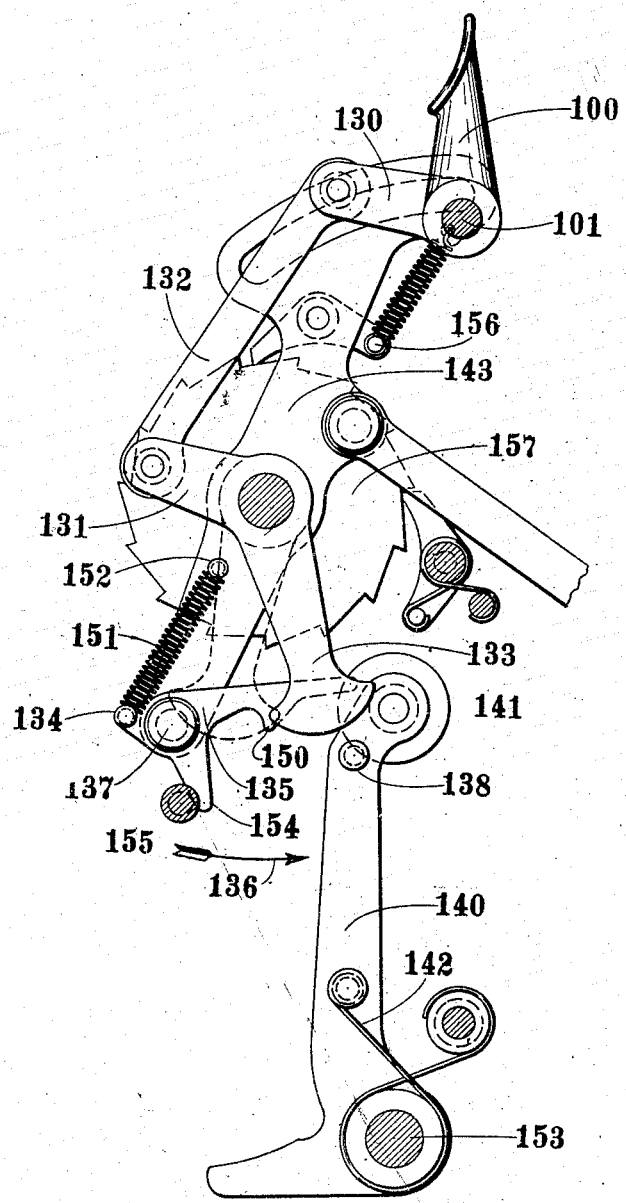

C. F. KETTERING & W. A. CHRYST.
CASH AND AUTOGRAPHIC REGISTER.
APPLICATION FILED FEB. 11, 1909.
1,137,062.
Patented Apr. 27, 1915.
9 SHEETS—SHEET 8.
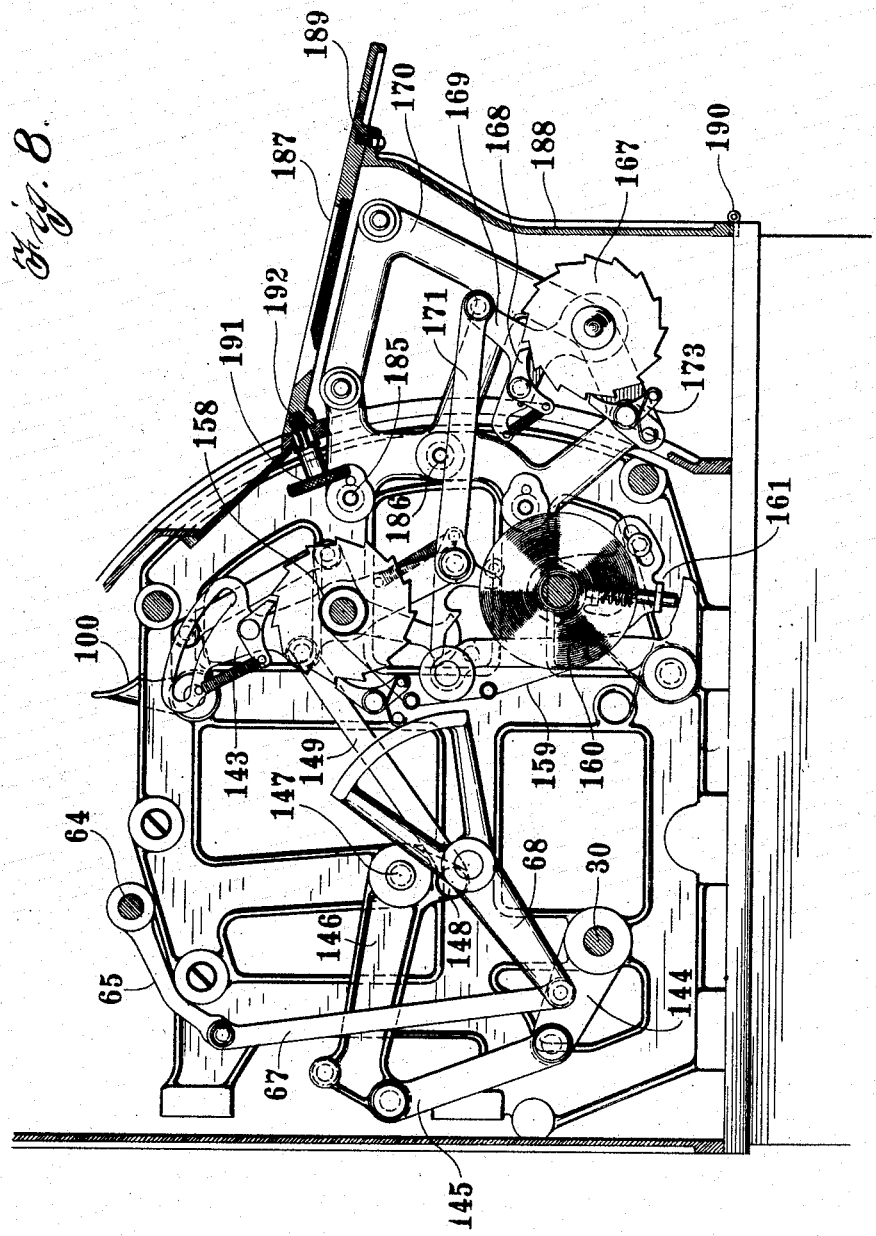

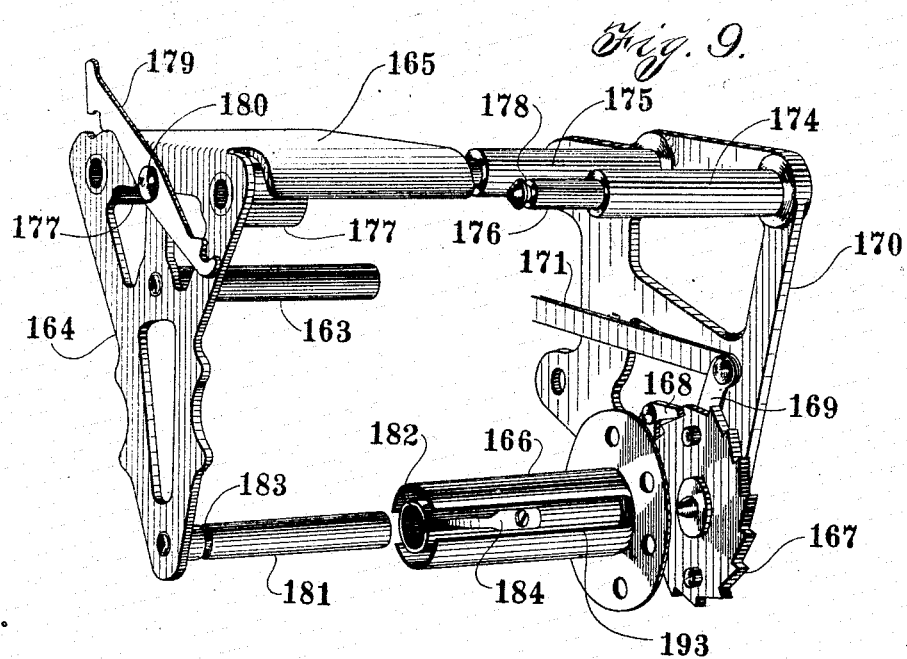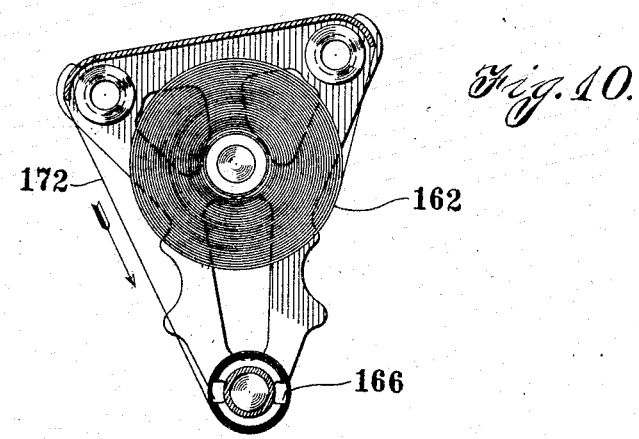

UNITED STATES PATENT OFFICE.

CHARLES F. KETTERING AND WILLIAM A. CHRYST, OF DAYTON, OHIO, ASSIGNORS TO THE NATIONAL CASH REGISTER COMPANY, OF DAYTON, OHIO, A CORPORATION OF OHIO, (INCORPORATED IN 1906.)

CASH AND AUTOGRAPHIC REGISTER.

1,137,062. Specification of Letters Patent. Patented Apr. 27, 1915.

Application filed February 11, 1909. Serial No. 477,419.

*To all whom it may concern:*

Be it known that we, CHARLES F. KETTERING and WILLIAM A. CHRYST, citizens of the United States, residing at Dayton, in the county of Montgomery and State of Ohio, have invented certain new and useful Improvements in Cash and Autographic Registers, of which we declare the following to be a full, clear, and exact description.

This invention relates to cash registers and more particularly to cash registers of the type described in a prior application filed by Charles F. Kettering and William A. Chryst, Serial No. 451,446, filed September 21, 1908, to which reference may be had for a complete description of such parts of the machine as do not relate directly to the present invention.

The machine of the prior application was of the drawer operated type, having keys on which the details or elements of transactions might be indicated, the movement of the drawer or receptacle supplying power for the moving parts of the machine. The present invention utilizes many of the mechanical movements of the prior machine, though differing in some particulars, and discloses improvements on said prior machine in several respects.

In the present case the moving power is furnished through the agency of a crank handle, the provision of such handle and its connecting mechanism being one of the objects of this invention. The crank handle or its operated mechanism is normally locked against operation until released by the actuation of two separate keys, or in the alternative, of a single resetting key, so that the provision of locking means having the function above outlined may be said to be another object of the construction.

It is frequently desirable to be able to make more extended records of transactions than is permitted by the available register keys. This end may be attained by the addition of a so-called autographic attachment or device, this being a device having a record material on which any desired matter may be recorded. The provision of such an attachment is another object in the present case, and, as disclosed herein, it comprises a record material and feeding and carrying means therefore, which may be readily attached to or detached from the register proper, and when so attached are connected for operation to the actuating devices of the mechanical register.

In the construction disclosed the further object of simplicity is attained by an interlocking construction of parts so that the autographic device may be put together without screws or rivets, whereby the replacing of the record material is rendered easy.

The construction of the register proper has been improved in several respects among which may be noted the provision of means whereby a complete depression or actuation of the totalizer resetting key is compelled, together with improved devices, for actuating the key detents for feeding the record material in the usual recording device, and for releasing the cash receptacle, and these improvements mentioned are also among the objects of the invention. In connection with the resetting key it may be pointed out that the construction provides means for either positively forcing the key outward or inward to its fully actuated position if it is left in an intermediate position.

With these and incidental objects in view the invention consists in certain novel features of construction and combinations of parts, the essential elements of which are set forth in appended claims, and a preferred form of embodiment of which is hereinafter described with reference to the drawings which accompany and form part of this specification.

Of said drawings: Figure 1, is a perspective view of the entire machine. Fig. 2 is a right end elevation of the cash register with the cabinet removed. Fig. 3 is a transverse vertical section of the mechanical register and illustrates one unit of the denominational elements of the key board, the differential mechanism, the totalizer and the indicators. Fig. 3ª is a detail of a restoring device for the differential mechanism. Fig. 3ᵇ is a detail of part of the indicator and type-wheel setting mechanism. Fig. 4 illustrates the resetting key and its safety device and also the mechanism which controls the meshing of the totalizer and the actuating segments of the differential mechanism. Fig. 5 illustrates the mechanism which controls the locking movement of the key locking detents and moves the key locking detents out of engagement with the keys upon the completion of an operation of the machine. This view also illustrates the combined machine lock and stop which prevents movement of the driving mechanism beyond its home position. Fig. 5ᴬ is a detail of a lever which is part of the locking mechanism shown in Fig. 5. Fig. 6 illustrates the nonlocking key detent and the key locking detent and part of the mechanisms which operate the same to release the keys upon the completion of an operation of the machine. Fig. 7 illustrates the actuating devices for the platen of the printing mechanism and the means which are actuated by the resetting key for causing these devices to become inoperative upon the depression of the resetting key. Fig. 8 is a transverse vertical sectional view of the printing mechanism and the autographic attachment. Fig. 9 illustrates in perspective the two units of the autographic frame separated from each other. Fig. 10 is a transverse vertical sectional view of the autographic device but with its casing removed.

The register illustrated in the drawings is adapted by means of printing mechanism and a totalizer mechanically to record individual amounts of transactions by printing and accumulating. It is also adapted by means of initial keys controlling a type carrier to cause the printing mechanism to identify each record with the operator who caused the record to be made.

The machine is provided with a bank of special keys, such as "Charge," "Paid out," and "Received on account," the depression of any one of which will cause the amount set up on the key board to be recorded by the printing mechanism upon the operation of the machine, but not to be added to the amount which is accumulated by the totalizer. The register is provided with indicating devices which indicate the amount of each record, the nature of the transaction, whether "Cash," "Received on account," etc., and also the initial of the operator who recorded the transaction. The register is also provided with an autographic attachment which feeds a strip of paper one step upon the operation of the machine. This autographic attachment is useful for receiving written notes regarding any transaction which is recorded in the register or for receiving records which are not recorded by means of the cash register. In the latter case the autographic paper ribbon is fed by an idle operation of the register without first depressing any of the amount keys, in which case, it is merely necessary to depress one of the initial keys and a special key and then rotate the crank of the register.

The amount keys are arranged in banks of different denominational values and serve as stops for oscillating segments of the differential mechanism. These segments are normally held in their zero positions by means of zero plungers which are controlled by the amount keys and a retaining device which is controlled by the main driving mechanism of the machine. The segments are all spring drawn so that when the zero plungers are moved out of the paths of the segments by depressing any desired ones of the amount keys and the driving mechanism then actuated, the segments will move forwardly under the action of their springs until stops carried by the segments reach the depressed keys. With reference to a single bank, if the "one" key is depressed, the segment for such bank will move one unit of its entire movement, whereas if a higher key is depressed, the segment will move the number of units which such higher key represents. When the segments are at rest in their moved positions, the totalizer is meshed with the segments and the segments are then returned to their zero positions, thus rotating pinions an amount which corresponds with the extent of forward movement of the segments. The segment gears are connected with type carriers to cause the type carriers to be properly positioned, but independent devices are provided for causing the movement of the printing type carriers. It is while the segments are at rest in their forward positions that the platen is operated to take an impression from the type carriers. The amount of any particular transaction is by this means recorded on the strip of detail paper.

When it is desired to reset the totalizer it is merely necessary to depress the resetting key and then rotate the crank. Depression of the resetting key causes all of the zero plungers to be moved out of the paths of the segments of the differential mechanism and also causes the totalizer to remain in mesh with the segments during the forward movement of the segments. In this case, the segments move forwardly far enough to cause each totalizer pinion to be backwardly rotated to its zero position, at which position pins carried by the totalizer pinions engage stops which prevent the pinions from rotating beyond their zero positions. The totalizer is then moved out of mesh with its actuating segments and the segments are returned to their home position. Upon the return of the segments to their home positions, the resetting key is released and the machine is then in condition to receive new records.

The driving mechanism is arranged to cause the paper strip of the printing mechanism to be fed one step toward the end of each operation of the machine. The feeding device of the paper strip of the printing mechanism is linked to the feeding device of the paper strip of the autographic attachment for the purpose of operating the feeding device of the autographic strip.

The cash register consists principally of a plurality of such units as are illustrated in Fig. 3. There is one such unit for each denominational division of the machine and also a similar unit for the bank of special keys and one for the bank of initial keys, but these two last mentioned units are not provided with means for actuating the totalizer, though in other respects they are similar to the unit illustrated by Fig. 3. Only one unit will be described in order to give a general idea of the construction of the cash register. The amount keys 1 of each bank are slidably mounted in the frame 2 and are arranged radially with respect to the segment 3 in a vertical plane with the segment and equally spaced from each other. The keys are depressible against the action of the springs 4 and engage pins 5 which are carried by a spring actuated detent 6 to cam the detent downwardly when the key is depressed. When the key has reached its innermost position, the cut-away part 7 of the shank of the key comes opposite the pin 5 and allows the detent to spring upwardly under the action of the spring 9 and through the engagement of the pin 5 with the shoulder 8 of the key will retain the key in its depressed position. If a key has been depressed by mistake it is then only necessary to depress the proper key, as when such key cams the detent 6 downwardly, the key which had been previously depressed will be released. The keys are so arranged that when depressed, their shanks will project into the channel 10, which is cut in the frame 2, and, in this position, will be in the path of the projection 11 of the segment 3. The detent 6 carries a pin 12 which when the detent is rocked downwardly upon the depression of one of the keys rocks the arm 13, which is pivoted at 14 to the frame 2 to carry the lug 15 of the arm 13 out of the path of the projection 11 of the segment 3. The lug 15 is situated at a point on the arm 13 normally to prevent the segment 3 from moving forwardly from its zero position, and therefore may be termed a zero plunger. After the proper keys have been depressed, the crank 16, (see Fig. 2), is twice rotated. The crank 16 is mounted upon a stub shaft 17 and is rigid with a similar sized gear 18 which meshes with a gear 19 and this in turn meshes with a gear 20 which is of twice the diameter of the gear 18, and, therefore, two rotations of the crank cause one rotation of the gear 20. The gear 20 carries a roller 21 extending into the slot 22 of the lever 23, which lever is pivoted on stub shaft 17 and is connected by the link 25 to the main operating arm 24, which is pivoted at 26 to the side frame 27. The rotation of the gear 20 and consequent movement of the pin 21 causes the lever 23 to be oscillated around the stub shaft 17 and as this lever is linked to the arm 24, the arm 24 will be correspondingly oscillated.

The arm 24 is connected by a link 28 to the lever 29 which lever is secured to the shaft 30. By this connection, when the arm 24 is oscillated, the shaft 30 will oscillate in accordance. The shaft 30 (see Fig. 3) carries the slotted cam arm 34 into the slot of which extends a roller 35 which is carried by a pair of arms 36 which are pivoted on studs 37 mounted on the side frames.

A rod 38 is carried by the arms 36 and extends beneath all of the shoulders 39 of the segments 3. When the shaft 30 is oscillated, the arm 34 is first carried upwardly and thereby forces the arms 36 and rod 38 downwardly, thus permitting all of the segments 3 of the banks in which keys have been depressed to move downwardly under the action of their springs 41 which are stretched between the rod 42, mounted on the side frames, and the pins 43 which are carried by each of the segments 3 upon rearwardly extending arms 44 thereof. The segments are stopped by the shanks of the keys which are depressed, but when the rod 38 passes the lowest point which the shoulders 39 of the segments 3 may reach, the concentric part 45 of the slot in the cam arm 34 reaches the roller 35 and will, therefore, permit the rod 38 to remain at rest for a certain period at its lowest position. At this time the pawls 46 are rocked into engagement with the alining teeth 47 of the segments 3 and thus lock the segments in their moved positions.

The alining pawls 46 are all rigidly mounted on the shaft 48 which also carries the arm 49, connected by a link 50 to the bell crank lever 51. The bell crank lever 51 is oscillated to carry the pawls 46 into engagement with the alining teeth 47 by the slotted cam member 52, which acts upon the roller 53 of the bell crank lever 51. The cam 52 is rigidly carried by the oscillating shaft 30 and the slot 54 in the cam 52 is concentric to the shaft 30 at the points 55 and 56, but the two parts of the slot 54 are offset from each other, consequently the effective part of the cam is at 57 and is so situated as to cause the bell crank lever 51 to be rocked to carry the pawls 46 into engagement with the alining teeth 47 when the segments 3 are at rest in their adjusted positions. Each segment 3 has pivoted thereto at 58 a beam or link 59. The rearward ends of the beams 59 are pivotally connected at 60 to the links 61 and midway between the pivots 58 and 60 carry the rollers 66. In the normal zero position of all parts, these rollers 66 are in the line of studs 37. The links 61 are pivotally connected at 62 to the arms 63 which are rigidly carried by the shafts 64, and the shafts 64, as indicated in Fig. 8, carry similar arms 65 which are linked by the links 67 to the type carrying segments 68. The links 61 are also connected at the points 62 to links 69 which are pivotally connected to the indicator operating segments 70 at 71.

The segment gears 70 mesh with pinions 72, carried by the indicator drums 73. When a segment 3 moves downwardly in the direction indicated by the arrow 40, its beam 59 is rocked around its pivot 60 accordingly an extent which corresponds to the extent of movement of the segment 3 and when so rocked carries its roller 66 out of the normal zero position, in which it is shown in Fig. 3, toward the curved edge 75 of the fork like cam 76, which is secured to the shaft 77 to which shaft a slotted arm 276 is securely fastened. Oscillating shaft 30 has secured thereto an arm 275 provided with a roller 277 (Fig. 3$^b$) extending into the slot in cam 276. The slot in cam 276 is so formed that when arm 275 rocks upward and after segments 3 are alined in their set positions, cam 276, shaft 77 and the members 76 will rock rearwardly, the surface 75 engaging the roller 66 and thereby causing the same to be returned to its zero position, but when the roller 66 is returned to its zero position, the beam 59 cannot be rocked around its pivot 60, as the pawl 46 at this time engages the alining teeth of the segments 3 and therefore holds the pivot 58 in a fixed position. The beam 59 will, therefore, be rocked around its pivot 58 when the cam 76 rocks rearwardly, and will cause longitudinal movement of the links 61 and 69 according to the distance between the zero position of the roller 66 and the position of the roller 66 when first engaged by the cam 76.

The longitudinal movement of the links 61 and 69 causes the indicator 73 to be rotated to indicate the amount represented by the depressed key and through the connections at 62, 63, 64, 65 and 67 causes the corresponding type of the segment 68 to be brought to the printing line in position to effect the impression of the amount represented by the key. After the indicator and type segment have been set, the shaft 30 is rocked back to its initial position. The pawl 46 is thereby disengaged from the segment 3 and the rod 38 is carried upwardly to its home position, thus causing the segment 3 to return to its zero position. This movement of the segment 3 will cause the beam 59 to be rocked upwardly around the pivot 60 and will thus carry the roller 66 a distance above its zero position, which is equal to the distance which it has been moved below its zero position. This being the case, if on the next operation of the machine, no key is depressed, when the cam 76 is rocked forwardly it will return the roller 66 to its zero position, thereby rocking the beam 59 around its pivot 58 downwardly enough to cause the indicator to be returned to its zero position and the corresponding type segment to bring the zero type to the printing line. Supposing that a key had been depressed in the operation which was last described, the roller 62 would be moved upon the forward movement of the segment 3 a number of units of its full nine units of movement equal to the difference between the amount represented by the key depressed and the amount of the key which had been depressed in the previous operation. For instance, if the key which had been depressed on the previous operation of the machine was the key which represents "two," at the end of the operation the roll 62 would be left two units distance above its zero position. Now, if upon the next operation of the machine, the key which represents "three" is depressed, the roll 62 will be carried downwardly one unit past its zero position, and when the cam 76 is moved rearwardly, the roll 62 will move upwardly only one unit, but this one unit will cause the indicator to be moved from the position in which it indicates two to the position in which it indicates three.

When the segments 3 are at rest in their lower positions, the totalizer 78 is rocked into mesh with the segment gears 79 which are secured to the segments 3 by a connection permitting one step of lost motion and remain in mesh with the segment gears 79 during the return movement of the segment 3 and thus the totalizer pinions will be rotated according to the extent of movement of the segments 3. The totalizer pinions are arranged to trip detents for the purpose of effecting transfers, which detents control an extra unit of movement of the segments 79 which for this purpose have a slot and pin connection with the segments 3. The totalizer is carried by a frame which is mounted upon the shaft 80, (see Fig. 3). This shaft is arranged to be oscillated at the proper time to cause the totalizer to be meshed or unmeshed with the actuating segments 79. The arrangement is such that the totalizer will be held in mesh with the segments 79, during normal operations of the machine when a cash sale is recorded, upon the return of the segments 3. The shaft 80 carries the arms 81 and 82, Fig. 4, and one of these arms is engaged by the forked member 83 to rock the shaft 80 at the proper times. The member 83 is pivoted at 84 to the bell crank lever 85, which is pivoted at 86 to the side frame 27 and the bell crank lever 85 is connected by a link 87 to the bell crank lever 88, pivoted to the side frame at 89. The bell crank lever 85 carries a roll 90 and the bell crank lever 88 carries a roll 91, which rolls are in position to be engaged by a pawl 92, pivotally carried by the arm 24 on pin 93, when the arm 24 rocks forwardly as indicated by the arrow 94, but upon the return of the arm 24, the pawl 92 idly wipes over the rollers 90 and 91. The pawl 92 engages the roller 91 soon after the crank 16 starts to rotate and will thereby push the link 87 in the direction of its length as indicated by the arrow 95. This will cause the bell crank lever 85 to force the member 83 upwardly and thereby cause the totalizer to be moved out of mesh with the segments 79, as the pin 96 of the member 83 normally engages the arm 81. This action takes place while the segments 3 are in their upper or zero positions, before the same are rocked downwardly. When the pawl 92 is passing between the roller 91 and the roller 90, the segments 3 are being moved downwardly and then locked in their moved positions, at which time the pawl 92 engages the roller 90 and thereby returns the bell crank lever 85 to its normal position, thus causing the member 83 to be drawn downwardly and rock the totalizer into mesh with the segments 3, the totalizer remaining in mesh during the return movement of the segments 3 and until the crank 16 starts to rotate upon the next succeeding operation of the machine.

The special keys control devices which when any of the special keys are depressed will rock the arm 83 about its pivot 84 to carry the roll 96 into the large opening 97 of the arm 81, though not far enough to carry the roll 98 into the notch 99 of the lever 82; but the mechanism which causes the arm 83 to be so rocked and which is controlled by the special keys does not operate until after the pawl 92 engages the roll 91 when the arm 24 is moving in a forward direction, as indicated by the arrow, but does operate before the pawl 92 reaches the roll 90. When one of the special keys is depressed, the pawl 92 will, therefore, engage the roll 91 and rock the totalizer out of mesh with the segments 3 upon the beginning of the forward stroke of the arm 24, but the arm 83 is then moved to the inoperative position, as explained, and when the pawl strikes the roll 90, the position of the totalizer will be unaffected, that is, it will remain out of mesh with the segment actuators 79, and for this reason, upon the return of the segments when special transactions are recorded, the amount will not be accumulated by the totalizer, the record being made merely by the printing mechanism, but it is also indicated as previously described.

Depression of the resetting key causes the arm 83 to be rocked around its pivot 84 far enough to carry the roll 98 into the notch 99 of the arm 82, which is rigid on the shaft 80 upon which the totalizer is mounted. When the machine is operated with the arm 83 in this last position, the time of meshing of the totalizer with the segments 79 is reversed from that in which it is meshed with the segments 79 when an amount is added to the totalizer. In resetting operations, the totalizer remains in mesh with the segments 79 during their forward strokes, so as to be reversely rotated to its zero position, and when the segments come to rest in forward positions, the totalizer is moved out of mesh and the segments are then returned to their home positions, leaving the totalizer reset. The resetting key 100 is securely fastened to the shaft 101, which shaft carries the cam arm 102. The arm 102 is arranged to engage a pin 103 on the arm 104 when the resetting key is pushed rearwardly and rock the arm 104 rearwardly, thus moving the link 105 which is pivoted to the arm 104 at 106 rearwardly in a longitudinal direction, and thereby engaging the pin 107 of the arm 83 and rocking the arm far enough to carry the roll 98 into the notch 99. The link 105 is slotted at 108 to permit the arm 83 to be rocked rearwardly when under the control of the special keys without affecting the position of the lever 104.

Devices are provided which will prevent partial depression of the resetting key 100, and then holding the resetting key in such intermediate position while operating the machine, because if this were possible, simply by partly pressing the key 100 and then operating the handle, a faulty operation of the machine could be effected. For instance, a partial depression of the key could cause the pin 96 to be carried into the opening 97 of the lever 81 and the machine would then operate as if one of the special keys were depressed.

The devices for preventing the holding of the resetting key in a partly depressed position are illustrated in Figs. 2 and 4, and comprise the arm 110, which is pivoted to the frame at 111, and the arm 112, which is pivoted at 113 to the arm 110. The arm 102, which is rigid with the resetting key shaft 101 carries at its rear end a roller 114, which, when the resetting key is moved rearwardly, engages the surface 115 of the arm 112 and thereby rocks the arm 112. If the resetting key is fully depressed, the roller 114 will pass beyond the point 116 of the arm 112, and the arm 112 will then rock rearwardly to carry the point 116 over the roller 114, it being weighted at 117 for this purpose. It will thereby prevent the return of the resetting key until the completion of the operation of the machine, when the arm 110 is rocked forwardly from its pivot, thereby carrying the arm 112 out of the path of the roller 114. The arm 110 also extends rearwardly from the pivot 111 at 118, and, at the rear end of the arm 118, carries the lever 119, which is pivoted to the arm 118 at 120, and carries a pin 121 extending into a circular opening 122 in the arm 118, and is thereby permitted to rock from its pivot 120 only a very slight amount.

The arm 119 carries a roller 123 which coacts with the cam 124 on the main operating arm 24. When the arm 24 rocks forwardly around its pivot pin 26 (see Fig. 2), as indicated by the arrow 94, the cam 124 engages the under side of the roller 123 and thereby forces the bell crank lever 125 to rock upwardly, as indicated by the arrow 126. The arm 110 of the bell crank lever 125 is provided with a V-shaped projection at 127, which, when the arm 110 is rocked rearwardly, will, if the resetting key is only partly depressed, engage the roller 114 of the arm 102 and positively either cam the arm 102 to carry the roll 114 below the point 116 of the arm 112, or else it will positively force the arm 102 upwardly and return the resetting key to its undepressed position. The direction in which the arm 102 is rocked in this case depends altogether on the extent that the resetting key 100 has been depressed.

The shaft 101 upon which the resetting key 100 is mounted also carries an arm 130 (see Fig. 7), which arm is connected to the bell crank lever 131 by means of the link 132.

The bell crank lever 131 may be rocked by depressing the resetting key to carry the downward extension 133 of the bell crank lever from the position indicated by full lines in Fig. 7 to the position indicated by broken lines and when in the position indicated by the broken lines it causes the platen mechanism to become inoperative, as in this position of the arm 133, the pin 134 of the hook 135 will engage the under surface of the arm 133 when the hook 135 is rocked rearwardly, as indicated by the arrow 136, and will thereby rock the hook 135 around its pivot 137 to prevent the hook from engaging the pin 138 of the platen arm 140.

The platen 141 is normally held in the position in which it is shown in Fig. 7 by the spring 142, but upon the operation of the machine is ordinarily drawn by the hook 135 forwardly and then released, allowing the platen to spring rearwardly and cause an impression to be taken from the type carriers 68 (see Fig. 8). The pawl 135 is pivotally carried by the lever 143, which is oscillated upon each operation of the machine by means of the oscillating shaft 36, which is connected to the lever 143 by the following mechanism.

The shaft 30 carries an arm 144 (see Fig. 8), which is connected by the link 145 to the arm 146, which is pivoted to the frame of the machine at 147. The arm 146 has a downwardly extending part 148 which is connected by the link 149 to the lever 143. Thus when the shaft 30 is oscillated, the lever 143 will be rocked first in the direction indicated by the arrow 136 (see Fig. 7), and then returned to its initial position. If upon the rocking of the lever 143, the resetting key is not depressed, the arm 133 of the bell crank lever 131 will be out of operative relation with the pin 134 of the hook 135, and when the arm 143 is rocked rearwardly, the extension 150 of the hook 135 will be caused to hook over the pin 138 of the platen arm 140 through the action of the spring 151 which connects the pin 134 of the hook 135 to the pin 152 extending from the side of the arm 143. When the arm 143 is returned to its initial position, the platen 140 will, therefore, be rocked backwardly from the pivot 153 until the extension 154 of the hook 135 engages the pin 155, which is fixed to the frame of the machine. When the hook 135 is rocked upwardly, the platen arm 140 is released and springs rearwardly through the action of the spring 142 to cause an impression to be taken from the type carriers 68.

If the resetting key is depressed, the arm 133 will be rocked to the position indicated by the broken lines, (see Fig. 7), and then when the arm 143 is oscillated, through the engagement between the pin and the bottom of the lever 133, the part 150 of the hook 135 will be held up clear of the pin 138 of the platen arm and will, therefore, not draw the platen arm forwardly upon the return of the arm 143. Thus by depression of the resetting key, the printing mechanism is made inoperative. Without this device for preventing impressions being made when the totalizer is reset, the total which has been accumulated by the totalizer would be recorded by the printing mechanism, because, in resetting operations, the segments 3 oscillate extents which correspond to the amount accumulated in the totalizer and, therefore, accurately set the type carriers 68 for an impression of the total.

It is not always desirable to equip the machine with as many type carries 68 as there are denominational elements in the totalizer. For instance, in the machine here illustrated by Fig. 1, there are four banks of amount keys, thus no single item of more than four denominations may be registered by the machine, and the machine is provided with only four amount segments 3, and four type segments 68, but there are a greater number of denominational elements in the totalizer. The capacity of the totalizer is, for this reason, greater than the capacity of the key board or the capacity of the printer, so the totals which may be accumulated by the totalizer cannot be printed when they include more than four denominations. For this reason, the devices for causing the printer to become inoperative upon resetting operations are desirable. These devices would not be necessary if there were as many type carriers and amount segments 3 as there are denominational elements in the totalizer.

When the totalizer is to be reset, it is evidently necessary to release the segments 3, as it is these which reversely move the totalizer elements. The segments are held in zero position by the zero plungers 13 and, as shown in Fig. 3, the shaft 101 on which the resetting key is mounted is provided with two rigid arms 316 connected by a frame rod 317. This frame rod is in such a position that actuation of the key 101 will rock the rod 317 and thereby withdraw the plungers 13 from the path of the segment stops 11. The segments 3 are then free to move and reset the totalizer elements.

The oscillating lever 143 carries a pawl 156 which, when the lever 143 is rocked, as indicated by the arrow 136, engages the ratchet 157, which ratchet is secured to a roll 158, (see Fig. 8), upon which the strip of detail paper 159 is received from the supply roll 160. The stroke of the lever 143 is of such length as to cause the ratchet 143 to rotate a distance equal to one tooth space of the ratchet upon each operation of the machine, the arrangement being such that the detail paper 159 is fed at the beginning of each operation of the machine, before the printing impression is taken.

The device shown at 161, (see Fig. 8), is an adjustable resilient stop for the platen arm 140, by means of which the force with which the platen strikes the type carrier 68 may be regulated.

*Autographic mechanism.*—Fig. 8 includes a vertical section of the autographic device and illustrates its construction and paper feeding mechanism. The supply roll 162 of autographic paper is carried by the rod 163 extending from the frame 164 of the autographic device. (See Figs. 9 and 10.) The paper is led from the supply roll 162 over the platform 165 down to the receiving roll 166. The receiving roll is secured to the ratchet 167 which is actuated by the pawl 168 (see Fig. 8), which is carried by the arm 169, pivoted concentrically with the ratchet 167 in the frame 170. The arm 169 is connected to the oscillating lever 143 by the link 171 and by this means causes the pawls 168 to actuate the ratchet 167 upon the return oscillation of the lever 143. Thus the detail paper 159 and the autographic paper 172 are fed by the same mechanism but the detail paper is fed upon the forward stroke of the lever 143, and the autographic paper upon the return stroke of the lever 143. The retaining pawl for the ratchet 167 is pivoted to the frame 170 at 173 (see Fig. 8). The structure of the autographic device is best illustrated by Fig. 9. The frame 170 carries the tie rods 174 and 175 which are cut away at 176 to fit within the tubes 177 which extend from the side of the frame 164. The outer ends of the shafts 174 and 175 are grooved at 178, which groove will come into line with the locking lever 179, which is riveted to the frame 164 at 180 when the frames 164 and 170 are assembled. The lever 179 is then rocked to enter the grooves 178 and thereby lock the two halves of the autographic frame together. The frame 164 carries a rod 181 which fits within the tube 182 of the supply roll 166, and thereby serves as a bearing for the supply roll. The shaft 181 is grooved at 183 into which groove the bent part of the spring 184 enters when the shaft 181 is within the tube 182. The frame 170 of the autographic is secured to the side frame of the register at 185 and 186. The frame 164 is supported by the frame 170. The hand rest 187 of the autographic is located immediately above the writing support 165 and is secured to the casing 188 of the autographic by the screws 189. The casing 188 is hinged to the register base at 190. The casing and the hand rest 187 are secured in place by the thumb screw 191, which may be screwed into the threaded holes 192 in the hand rest 187. The roll of supply paper is placed in the autographic in the following manner; First the thumb screws 191 are unscrewed, access being had to them by rocking the side lid shown in Fig. 1, and the casing of the autographic is swung away from the register around its hinge 190. The lever 179 is then swung to the position in which it is shown in Fig. 9, and the frame 164 is drawn away from the frame 170. The supply roll 162 is then placed upon the rod 163. The frame 164 is then replaced and the lever 179 rocked to enter the grooves 178 and thereby latch the two frames 164 and 170 together. The paper is then led from the supply roll over the platform 165 and the end of the paper is inserted in the cut 193 in the receiving roll 166, and the receiving roll is then given one or two turns in order that the paper will bind itself to the roll 166. If it is desired to remove the autographic device entirely from the cash register, the thumb screws 191 are unscrewed and the pins are removed from the hinges 190, thus making it possible to remove the casing of the autographic. Then the link 161 is disconnected from the link 143 and the autographic frame is disconnected from the side frame of the register at 185 and 186. It is then possible to remove the entire autographic device.

*Key releasing mechanism.*—Both the key detents are spring pressed to engaging position with the keys. In order to release the depressed keys at the end of an operation, these detents must be rocked downwardly. The key detent 6 which hold the keys in depressed position but does not positively lock them in such position is carried by the arms 195 and 196 (see Fig. 6). This detent is rocked downwardly to disengage its pin 5 from the depressed key upon the completion of an operation of the machine by the bell crank lever 197, which is loosely mounted upon the rod 198 and is actuated to force the detent 6 downwardly by the wiper pawl 199 (see Fig. 2), which is carried by the main operating arm 24 and engages the roll 200 when the arm 24 is returned to its home position. The lever 201 is pivoted to the side frame of the register at 202 and extends downwardly from its pivot, the downward extension being pivotally connected with the link 203 and when the lever is rocked at the time of being engaged by the pawl 199, it draws the link 203 rearwardly and thus causes the bell crank lever 197 to bear down upon the arm 195 and thereby lower the detents 6 to release the depressed keys. The locking detent 205 carries the pins 206 and, when the driving mechanism starts to operate, is forced upwardly to cause the pins 206 to enter the notches 207 of all keys which are not depressed and the notch 208 of the key which is depressed. The detent is held in engaging position until the completion of the operation of the machine and for this reason prevents movement of any of the keys while the machine is being operated. The manner of actuating the detent 205 is illustrated by Figs. 5 and 6. The gear 20, (see Fig. 5), which is caused to make one complete rotation upon each operation of the machine carries the lug 209, which coacts with the bell crank lever 210, pivoted at 2105 so as normally to prevent rotation of the gear 20 in the direction indicated by the arrow 211, (see Fig. 5). It is, therefore, necessary to rock the crank 16 slightly back to cause the gear to rotate backwardly far enough to permit the bell crank lever to drop out of the path of the lug 209 before the crank 16 may be rotated in a forward direction to operate the machine. The bell crank lever 210 is drawn downwardly by the spring 212 through its connection at pin 213 to a link 214 pivoted to the arm 215, which is carried by the shaft 216. The shaft 216 also carries an arm 217 which is connected by the link 218 to the lever 219 (see Fig. 6) and which is secured to the rod 220. The lever 219 carries a rod 221 which extends into the cut 222 in the arm 223 to which the locking detent 205 is pivoted. The upper end of the detent is pivotally connected to the arm 224 which is loosely journaled upon the shaft 225. When the bell crank lever 210 is swung downwardly under the action of the spring 212, the shaft 216 is rocked by means of the same spring to draw downwardly upon the link 218 and thereby rock the lever 219 to force the detent 205 into engagement with the keys and thereby prevent manipulation of the keys while the machine is operating. Just before the gear 20 completes its rotation, the pin 226, which is carried by the gear 20, engages the extension 227 of a pawl 228, which is pivotally mounted at 229 to the bell crank lever 210. When the pawl 228 is engaged by the pin 226, it is caused to swing on its pivot 229 until the extension 230 of the pawl engages the pin 231 of the bell crank lever 210. The continued rotation of the gear 20 causes the pin 226 to cam the pawl 227 out of its path and in doing so, the lever 210 is rocked to its home position where it acts as a stop to the gear 20, and in rocking back to its home position pulls upwardly upon the link 214, which, through the arm 215, shaft 216, arm 217, link 218, lever 219, and pin 221, rocks the arm 223 downwardly from its pivot 232, thus carrying the detent 215 downwardly and causing the pins 206 to move out of the notches 207 and 208 of the keys.

A retaining pawl 194 rests by gravity upon the gear 20 at such an angle as to permit forward rotation of the gear, and the stop 210 is so located as to stop the gear 20 at a point where one of the teeth of the gear will come to rest just below the tip of the pawl 194. It is, therefore, possible to backwardly rotate the gear 20 just one tooth space of the gear as the pawl will drop into the path of the next tooth when the tooth which comes to rest beneath the pawl 194 is moved backwardly.

The detents 6 of the banks of initial keys and special keys are carried at their lower ends by arms 233 which are differently shaped from the arms 196 of the detents 6 of the amount banks. One of these arms of the special and initial banks is illustrated in Fig. 5 at 231. It is shaped to extend in under the rod 234, which is carried by the arm 235, rigid with the shaft 216 normally to prevent the oscillation of the shaft 216, and the shaft 216 must oscillate in order to permit the bell crank lever 210 to clear the lug of the gear 20. Therefore, before the machine can be operated, it is necessary to depress both one of the initial keys and one of the special keys, as the depression of keys in these banks causes the arms 233 to rock out of the path of the rod 234.

In the case of a resetting operation, the special keys are not depressed and other means for releasing the crank handle must be provided. This may be accomplished in many ways, but, in the present case, the frame rod 317, (see Fig. 3), which withdraws the zero plungers when the resetting key 100 is actuated, is also connected to raise the key detents and thereby release the main crank handle. As shown in Fig. 3, the key detents for the transaction and initial keys are provided at their upper ends with projections 318, which are in the path of frame rod 317, and are raised thereby when the resetting key 100 is actuated. It will, therefore, be seen that an actuation of the resetting key will serve to release the lock for the crank handle without depression of the initial or department keys. Moreover the elevation of the key detents by rod 217 prevents subsequent actuation of the keys, as such keys are locked by the detents.

*Drawer latch and drawer release.*—The drawer latch is indicated at 235, (see Fig. 2). It is merely a spring pressed hook which hooks over the rear wall 236 of the cash drawer and normally prevents the cash drawer from opening under the action of its springs 237. The oscillating shaft 30 carries an arm 238 to which is pinned the roll 239. When the shaft 30 is rocked in the direction indicated by the arrow 240, the roll 239, engages the pawl 241 on the latch 235 and merely rocks the pawl upon its pivot 242, but upon the return movement of the shaft 30, the roll 239 engages the surface 243 of the pawl 241, and as the pawl is prevented from rocking by the pin 244 on the latch 235, the roll 239 compels the latch 235 to rock upwardly from its pivot 245 and thereby release the cash drawer 246, which will then spring outwardly under the action of the springs 237. The cash drawer is returned to its inner position by hand and when moved inwardly, it forces the pawl 235 upwardly until the wall 236 passes the hook of the pawl, when the pawl drops downwardly and holds the drawer in its inner position.

*Operation.*—The operation of the device is as follows: If a cash sale is to be recorded, the operator will depress his initial key, the cash key, which is the upper key in the bank of special keys and the amount keys which represent the amount he wishes to record. The crank handle 16 is then twice rotated causing the segments 3 to move downwardly until stopped by the depressed key, when the segments are locked in their lowered positions. The cam 76 is rocked into engagement with the roller 66, of the beam 59 and thereby effects the setting of the indicators. The cam 76 is then rocked clear of the roll 66, the totalizer is rocked into mesh with the segments 79, the locking pawls 46 are moved out of engagement with the alining teeth 47 of the segments 3 and all of the segments are returned to their zero positions, by means of the rod 38 which is rocked upwardly for this purpose and as the segments 79 are meshed with the totalizer 78 upon the return of the segments 3, the amount which has been set up on the key board will be accumulated in the totalizer. The type segments are set simultaneously with the indicators by means of the arms 63, shafts 64, arm 65 and link 67, which connect the indicator setting links 61 with the type carrier 68. The shaft 30 is caused to oscillate by means of its connection with the oscillating arm 24, this connection being the arm 29 which is secured to the shaft 30, and the link 28 which connects the arm 29 with the main operating arm 24. The shaft 30 carries the arm 238 which operates the drawer latch 235 at the end of the operation of the machine. The arm 24 rocks forwardly while the segments 3 are moved downwardly and returns with the segments 3, but the arm 24 does not remain at rest in its forward position as the segments 3 do, but continues to move forwardly at which time the cams 76 and 56 which are operated by the shaft 30 become effective, one positioning the indicators while the segments are at rest, the other locking the segments against movement while at rest. The oscillating shaft 30, through the mechanism illustrated in Fig. 8, viz., the arm 144, link 145, arm 146 and link 149 serves to oscillate the lever 143, and when oscillated causes the feed of the strip of detail paper and also the feed of the autographic paper and actuates the spring pressed platen arm 140 to cause an impression to be made immediately after the feed of the detail strip 159 is accomplished. When special transactions, such as "Charge", "Paid out", or "Received on account" are recorded, the machine is operated in the same way except that the totalizer is not meshed with the segments 79. Therefore, the amounts of these special transactions are merely recorded by the printing mechanism and indicated, but it is here that the autographic device is particularly useful, in that, it enables the operator to make notations upon the autographic strip regarding the particular transaction and as the autographic strip and the detail strip are fed like amounts upon each operation of the machine, it is a simple matter to ascertain to which record on the detail strip 159 a particular notation on the autographic strip relates.

The autographic device is not only useful for receiving notations in regard to special transactions, but may also be used to keep track of stock or records of the articles which are sold.

It will be seen from Fig. 2, that the main operating mechanism forms a so called "quick return device", such quick return following from the fact that the driving roller 21 is much nearer the pivot 17 of the crank arm 23 as the roller returns to the position of the figure than in its motion away from the position shown. It will, therefore, be evident that even if the crank handle has a constant angular velocity, the velocity of movement of the driven parts will vary not only during separate parts of the strokes of main lever 24, but also the whole return of lever 24 will be quicker than its forward motion. This construction is of distinct advantage for the reason, among others, that the slow forward motion of lever 24 prevents a "jumping" ahead of the operating rod 38, as compared to the segments 3.

While the form of mechanism herein shown and described is admirably adapted to fulfil the objects primarily stated, it is to be understood that it is not intended to confine the invention to the one form of embodiment herein disclosed, for it is susceptible of embodiment in various forms all coming within the scope of the claims which follow.

What is claimed is as follows:—

1. In a machine of the class described, an autographic mechanism comprising a side frame, carrying rods projecting from said frame, a second side frame, sleeves projecting from said second frame and positioned to surround said projecting rods, a latch carried by said second side frame and positioned to engage said projecting rods to lock said frame in proper position, a record table carried by one of said side frames, and devices for supplying and feeding a record strip; in combination with a cash register having movable parts, with connections from said movable parts to the feeding devices of the autographic mechanism.

2. In an accounting machine, the combination with a totalizer comprising a plurality of pinions, of means for differentially rotating the pinions of the totalizer in a forward direction, means for backwardly rotating the totalizer pinions to their zero positions, a depressible resetting key for controlling said latter means, driving mechanism, and means operated by the driving mechanism for preventing the resetting key from being held in a position intermediate its undepressed position and its depressed position.

3. In an accounting machine, the combination with a totalizer comprising a plurality of pinions, of means for rotating said pinions in a forward direction, means for backwardly rotating the pinions to their zero positions, a depressible resetting key for controlling said means, driving mechanism, a member operated by the driving mechanism and a co-acting member carried by the resetting key, said members operating when the driving mechanism is operated to cause the resetting key to be moved either to its undepressed postion or its fully depressed position if the resettting key is in an intermediate position at the time the driving mechanism is operated.

4. In an accounting machine, the combination with a totalizer comprising a plurality of pinions, means for differentially rotating the totalizer pinions in a forward direction, means for backwardly rotating the totalizer pinions to their zero positions, a depressible resetting key for controlling said means, a member carried by the resetting key, driving mechanism, a V-shaped member which is actuated by the driving mechanism which when the driving mechanism is operated moves toward the member carried by the resetting key and cams the same to force the resetting key to its undepressed position or to its fully depressed position if the resetting key is in an intermediate position.

5. In an accounting mechanism, the combination with a totalizer comprising a plurality of pinions, of means for differentially rotating the totalizer pinions in a forward direction, means for backwardly rotating the totalizer pinions to their zero positions, a depressible key for controlling said means, driving mechanism, and means actuated by the driving mechanism which if the key is only partly depressed will force the key back to its undepressed position.

6. In an accounting machine, the combination with a totalizer comprising a plurality of pinions, of means for differentially rotating the pinions in a forward direction, means for backwardly rotating the pinions to their zero positions, a key for controlling said means, driving mechanism, and means operated by the driving mechanism which will force the key into its fully depressed position if the key has only been partly depressed.

7. In an accounting machine, the combination with registering mechanism, of driving mechanism for the registering mechanism, depressible keys for controlling the driving mechanism, a detent for retaining said keys in depressed positions, a machine lock actuated by a backward movement of the driving mechanism, and connections whereby said machine lock operates the key detent.

8. In an accounting machine, the combination with registering mechanism, of driving mechanism for the registering mechanism, depressible keys for controlling the driving mechanism, a locking detent which operates to lock the keys against movement when the driving mechanism is in operation, a machine lock actuated by a backward movement of the driving mechanism, and connections whereby said machine lock operates the locking detent.

9. In an accounting machine, the combination with a registering device and driving mechanism for operating the registering device, of a manipulative device, a stop arranged to prevent the driving mechanism from passing its home position upon an operation of the machine, means for moving the stop to permit an operation of the machine, devices normally preventing operation of said means, and connections from said manipulative device for disabling said preventing devices.

10. In a machine of the class described, the combination with a main operating lever, of a driving gear bearing a roller, a crank arm having a slot in which said roller rides, a link connecting said crank arm and said main lever, and registering mechanism actuating by said main lever.

11. In an accounting machine, the combination with a registering mechanism, means for resetting the same to zero, a depressible key for controlling said resetting means, a main operating mechanism and connections intermediate the key and main operating mechanism for controlling the latter from the former and means actuated by said main operating mechanism for forcing the key into its fully depressed position if the key has been only partly depressed.

12. In an accounting machine, the combination with a registering mechanism, means for resetting the same to zero, a depressible key for controlling said resetting means, a main operating mechanism and connections intermediate the key and main operating mechanism for controlling the latter from the former and means actuated by said main operating mechanism for forcing the key back to its undepressed position if the key has been only partly depressed.

13. In an accounting machine, the combination with a registering mechanism, means for resetting the same to zero, a depressible key for controlling said resetting means, a main operating mechanism and connections intermediate the key and main operating mechanism for controlling the latter from the former and means actuated by said main operating mechanism for forcing the key either into its fully depressed position or back to its undepressed position if the key has been only partly depressed.

14. In an accounting mechanism, the combination with a registering mechanism and means for resetting the same to zero, a main operating device and means for normally locking the same against operation, a resetting key for controlling the operation of said resetting means and disabling said locking means and means actuated by the main operating device for forcing the key into its fully depressed position if the key has been only partly depressed.

15. In an accounting mechanism, the combination with registering mechanism and means for resetting the same to zero, a main operating device and means for normally locking the same against operation, a resetting key for controlling the operation of said resetting means and disabling said locking means and means actuated by the main operating device for forcing the key back to its undepressed position if the key has been only partly depressed.

16. In an accounting machine, the combination with a registering mechanism and means for resetting the same to zero, a main operating device and means for normally locking the same against operation, a resetting key for controlling the operation of said resetting means and disabling said locking means and means actuated by the main operating device for forcing the key either into its fully depressed position or back to its undepressed position if the key has been only partly depressed.

In testimony whereof we affix our signatures in the presence of two witnesses.

CHARLES F. KETTERING.
WILLIAM A. CHRYST.

Witnesses:
F. E. HAMILTON,
R. RUMMLER.